(12) United States Patent
Bang et al.

(10) Patent No.: US 11,321,811 B2
(45) Date of Patent: May 3, 2022

(54) IMAGING APPARATUS AND DRIVING METHOD OF THE SAME

(71) Applicant: Samsung Display Co., Ltd., Yongin-Si (KR)

(72) Inventors: Jonguk Bang, Gyeongju-si (KR); Joo-Young Lee, Hwaseong-si (KR); Jinwon Kim, Osan-si (KR); Sun Hyang Song, Hwaseong-si (KR); Myoung Hee Lee, Suwon-si (KR)

(73) Assignee: SAMSUNG DISPLAY CO., LTD., Gyeonggi-do (KR)

(*) Notice: Subject to any disclaimer, the term of this patent is extended or adjusted under 35 U.S.C. 154(b) by 204 days.

(21) Appl. No.: 16/707,597

(22) Filed: Dec. 9, 2019

(65) Prior Publication Data

US 2020/0211156 A1 Jul. 2, 2020

(30) Foreign Application Priority Data

Dec. 27, 2018 (KR) ........................ 10-2018-0170116

(51) Int. Cl.
*G06T 3/40* (2006.01)
*G06T 7/00* (2017.01)

(52) U.S. Cl.
CPC ............... *G06T 3/40* (2013.01); *G06T 7/001* (2013.01); *G06T 2207/30121* (2013.01); *G06T 2210/22* (2013.01)

(58) Field of Classification Search
CPC . G06T 3/40; G06T 7/001; G06T 2207/30121; G06T 2210/22; G06T 7/11; G06T 7/174; G06T 2207/10024; G06T 2207/20132; G06T 2207/10004; G06T 7/0002; H04N 5/2253; H04N 5/23227; H04N 5/225; G09G 3/006

See application file for complete search history.

(56) References Cited

U.S. PATENT DOCUMENTS

| | | | | |
|---|---|---|---|---|
| 2004/0213449 A1* | 10/2004 | Safaee-Rad | ........... | G06T 7/0004 382/141 |
| 2005/0162517 A1* | 7/2005 | Fujihara | ............... | H04N 17/002 348/187 |
| 2009/0096778 A1* | 4/2009 | Su | .......................... | G09G 3/006 345/214 |
| 2012/0026315 A1* | 2/2012 | Lee | ......................... | G09G 3/006 348/92 |
| 2014/0285642 A1* | 9/2014 | Hwang | .................. | G02B 30/27 348/58 |

(Continued)

FOREIGN PATENT DOCUMENTS

KR 101964202 B1 4/2019

OTHER PUBLICATIONS

Author Unknown, "Image Sensor", Wikipedia, Old Revision Dated Nov. 18, 2018 (Year: 2018).*

*Primary Examiner* — Aaron W Carter
(74) *Attorney, Agent, or Firm* — Cantor Colburn LLP

(57) ABSTRACT

An imaging apparatus an image sensor which generates a reference image data of a reference area that includes a measuring area in which a display panel is positioned and an image processor which determines the measuring area by analyzing luminance of the reference image data and generates a crop image data that includes a measuring image data of the measuring area.

19 Claims, 6 Drawing Sheets

(56) References Cited

U.S. PATENT DOCUMENTS

| | | | | |
|---|---|---|---|---|
| 2014/0333681 A1* | 11/2014 | Oh | ............................ | G09G 3/20 |
| | | | | 345/690 |
| 2015/0287350 A1* | 10/2015 | Jun | ......................... | G09G 3/006 |
| | | | | 345/690 |
| 2016/0050402 A1* | 2/2016 | Jeong | ........................ | H04N 9/69 |
| | | | | 348/674 |
| 2016/0111051 A1* | 4/2016 | Jeon | ...................... | G09G 3/3674 |
| | | | | 345/204 |
| 2019/0355291 A1* | 11/2019 | Kim | ...................... | G09G 3/2003 |
| 2020/0211156 A1* | 7/2020 | Bang | .......................... | G06T 3/40 |
| 2021/0029347 A1* | 1/2021 | Yoo | ....................... | G09G 3/3225 |

\* cited by examiner

| DISPLAY PANEL | IMAGE SENSOR | IMAGE PROCESSOR | ANALYZER |
|---|---|---|---|
| 1ST TEST PATTERN | | | |
| 2ND TEST PATTERN | | | |
| 3RD TEST PATTERN | | | |
| 4TH TEST PATTERN | | | |

| DISPLAY PANEL | IMAGE SENSOR | IMAGE PROCESSOR | ANALYZER |
|---|---|---|---|
| 1ST TEST PATTERN |  |  |  |
| 2ND TEST PATTERN |  |  |  |
| 3RD TEST PATTERN |  |  |  |
| 4TH TEST PATTERN |  |  |  |

IMAGING APPARATUS AND DRIVING METHOD OF THE SAME

This application claims priority to Korean Patent Application No. 10-2018-0170116, filed on Dec. 27, 2018, and all the benefits accruing therefrom under 35 U.S.C. § 119, the content of which in its entirety is herein incorporated by reference.

BACKGROUND

1. Field

Exemplary embodiments relate generally to an imaging apparatus and a driving method of the same.

2. Description of the Related Art

Defects of a display panel may be detected in a manufacturing process of a display device using an imaging apparatus. The imaging apparatus may photograph a surface of the display panel and output an image to an analyzer. When an image range of the imaging apparatus is greater than an area of the display panel, the analyzer may perform a cropping that removes an image of a peripheral portion of the display panel from the image output from the imaging apparatus using an algorithm.

SUMMARY

When an analyzer performs a cropping using an algorithm, there is a problem that an amount of data transferred from the imaging apparatus and a data processing time increase.

Some exemplary embodiments provide an imaging apparatus capable of outputting crop image data.

Some exemplary embodiments provide a driving method of the imaging apparatus capable of outputting crop image data.

In an exemplary embodiment, an imaging apparatus includes an image sensor which generates a reference image data of a reference area that includes a measuring area in which a display panel is positioned and an image processor which determines the measuring area by analyzing luminance of the reference image data and generates a crop image data that includes a measuring image data of the measuring area.

In an exemplary embodiment, the image processor may generate an image sensor control signal that operates the image sensor corresponding to the measuring area.

In an exemplary embodiment, when the display panel displays a first test pattern, the image sensor may generate the reference image data that includes the measuring area, and the image processor may generate a first crop image data that includes the measuring image data based on the reference image data.

In an exemplary embodiment, when the display panel displays a second test pattern, the image sensor may generate the measuring image data of the measuring area based on the image sensor control signal, and the image processor may output the measuring image data provided from the image sensor as a second crop image data.

In an exemplary embodiment, the image processor may include a measuring area determiner which determines the measuring area based on the reference image data, a crop image data generator which generates the crop image data, and a control signal generator which generates the image sensor control signal based on the measuring area.

In an exemplary embodiment, when the display panel displays a first test pattern, the image processor may generate a first crop image data that includes the measuring image data based on the reference image data, and when the display panel displays a second test pattern, the image processor may generate a second crop image data that includes the measuring image data based on the reference image data.

In an exemplary embodiment, the image processor may include a measuring area determiner which determines the measuring area based on the reference image data and a crop image data generator which generates each of the first crop image data and the second crop image data.

In an exemplary embodiment, the image sensor may be a complementary metal oxide semiconductor ("CMOS") image sensor.

In an exemplary embodiment, the image sensor may be a charge coupled device ("CCD") image sensor.

In an exemplary embodiment, the image processor may be coupled to an analyzer, and the analyzer may display a crop image corresponding to the crop image data.

In an exemplary embodiment, a driving method of an imaging apparatus includes an operation of displaying a first test pattern on a display panel, an operation of generating a reference image data of a reference area that includes a measuring area in which the display panel is positioned using an image sensor, an operation of determining a measuring area by analyzing the reference image data, an operation of generating an image sensor control signal and a first crop image data that includes a measuring image data of the measuring area based on the reference image data and the measuring area, an operation of displaying a second test pattern on the display panel, an operation of generating the measuring image data of the measuring area using the image sensor corresponding to the measuring area, and an operation of outputting the measuring image data provided from the image sensor as a second crop image data.

In an exemplary embodiment, the operation of generating the measuring image data may include an operation of operating the image sensor corresponding to the measuring image.

In an exemplary embodiment, the operation of determining the measuring area may include an operation of analyzing luminance of the reference image data.

In an exemplary embodiment, the image sensor may be a CMOS image sensor.

In an exemplary embodiment, the image sensor may be a charge coupled device ("CCD") image sensor.

According to an exemplary embodiment, a driving method of an imaging apparatus may include an operation of displaying a test pattern on a display panel, an operation of generating a reference image data of a reference area that includes a measuring area in which the display panel is positioned using an image sensor, an operation of determining the measuring area by analyzing the reference image data, and an operation of generating a crop image data that includes a measuring image data of the measuring area based on the reference image data and the measuring area.

In an exemplary embodiment, the operation of determining the measuring area may include an operation of analyzing luminance of the reference image data.

In an exemplary embodiment, the image sensor may be a CMOS image sensor.

In an exemplary embodiment, the image sensor may be a CCD image sensor.

Therefore, the imaging apparatus and the driving method of the imaging apparatus may generate the reference image data of the reference area that includes the measuring area in which the display panel is positioned, detect the measuring area based on the luminance of the reference image data and generate the crop image data that represents the measuring image data of the measuring area by cropping the reference image data. Further, the imaging apparatus and the driving method of the imaging apparatus may generate crop image data by operation the image sensor corresponding to the measuring area. Thus, an amount of data output from the imaging apparatus and data processing time may be decreased.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION

Figure 1:
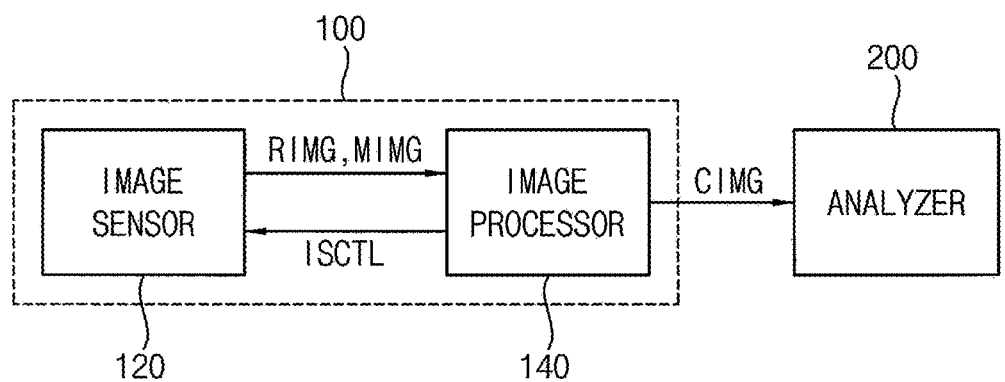
FIG. 1 is a block diagram illustrating an exemplary embodiment of an imaging apparatus.

Hereinafter, the invention will be explained in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
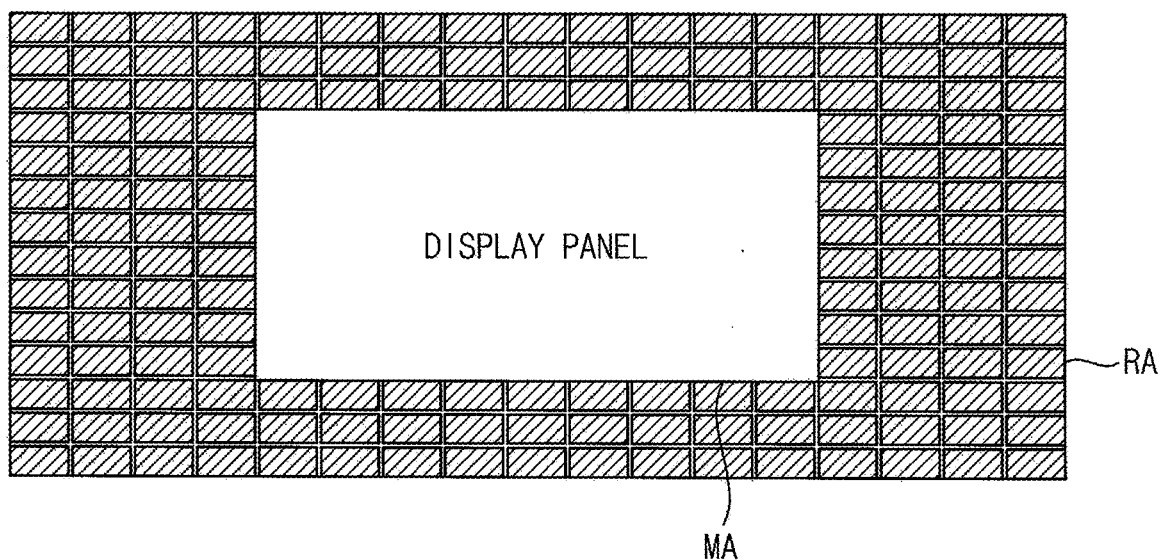
FIG. 2 is a diagram illustrating an image range of an image sensor included in the imaging apparatus of FIG. 1.
Figures 3, 4:
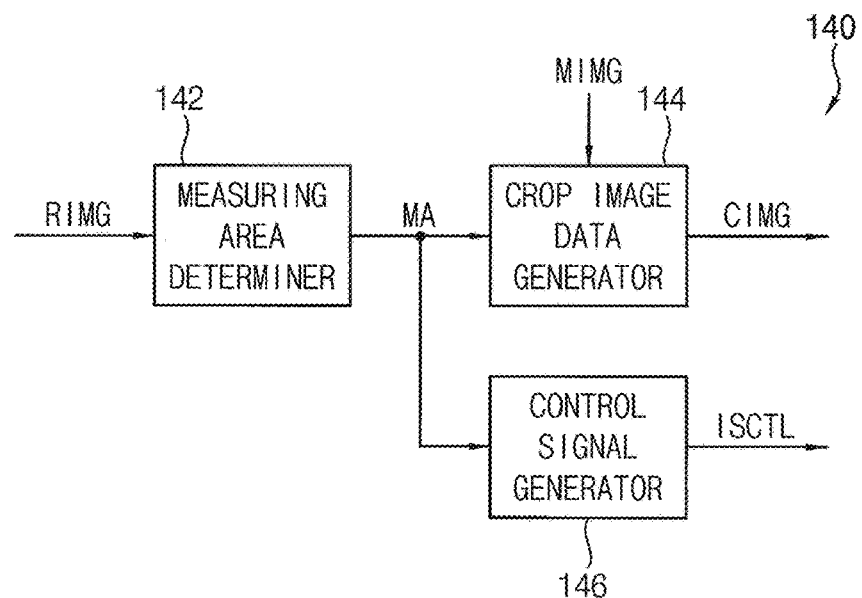
FIG. 3 is a block diagram illustrating an image processor included in the imaging apparatus of FIG. 1.
FIG. 4 is a diagram illustrating for describing an operation of the imaging apparatus of FIG. 1.

FIG. 1 is a block diagram illustrating an exemplary embodiment of an imaging apparatus. FIG. 2 is a diagram illustrating an image range of an image sensor included in the imaging apparatus of FIG. 1. FIG. 3 is a block diagram illustrating an image processor included in the imaging apparatus of FIG. 1.

Referring to FIG. 1, an imaging apparatus 100 in an exemplary embodiment may include an image sensor 120 and an image processor 140. The imaging apparatus 100 may be coupled to an analyzer 200.

The image sensor 120 may generate a reference image data RIMG of a reference area RA that includes a measuring area MA in which a display panel is positioned. Referring to FIG. 2, the reference area RA may include the measuring area MA. The display panel may be positioned in the measuring area MA. In an exemplary embodiment, the display panel may be one of a liquid crystal display ("LCD") panel, a field emission display ("FED") panel, a plasma display panel ("PDP"), and an organic light emitting display ("OLED") panel, for example. A size of the measuring area MA may be changed based on a size of the display panel. The image sensor 120 may convert a light signal that includes image information of the reference area RA to an electric signal. In some exemplary embodiments, the image sensor 120 may be a charge coupled device ("CCD") image sensor. In other exemplary embodiments, the image sensor 120 may be a complementary metal oxide semiconductor ("CMOS") image sensor. The image sensor 120 may generate the reference image data RIMG of the reference area RA.

The image processor 140 may determine the measuring area MA by analyzing luminance of the reference image data RIMG and generate a crop image data CIMG that includes measuring image data MIMG of the measuring area MA.

Referring to FIG. 3, the image processor 140 may include a measuring area determiner 142, a crop image data generator 144, and a control signal generator 146.

The measuring area determiner 142 may receive the reference image data RIMG from the image sensor 120. The measuring area determiner 142 may detect the measuring area MA by analyzing the luminance of the reference image data RIMG When the display panel is positioned in the measuring area MA and the display panel displays a test pattern, a luminance difference between an area in which the display panel is not positioned and the measuring area MA in which the display panel is positioned may be occurred. In an exemplary embodiment, when the display panel displays the test pattern that is white color, the area in which the display panel is not positioned may represent a black color and the measuring area MA in which the display panel is positioned may represent the white color, for example. The measuring area determiner 142 may determine the measuring area MA using the luminance difference of the reference image data RIMG The crop image data generator 144 may generate a crop image data CIMG that includes measuring area data of the reference image data RIMG That is, the crop image data generator 144 may crop an image data of a peripheral area that surrounds the measuring area MA while remaining an image data corresponding to the measuring area MA of the reference image data RIMG The crop image data generator 144 may output the crop image data CIMG to the analyzer 200.

The analyzer 200 may display a crop image corresponding to the crop image data CIMG provided from the image processor 140 on the display panel and detect defects by analyzing the crop image.

The control signal generator 146 may generate an image sensor control signal ISCTL that operates the image sensor 120 corresponding to the measuring area MA. The control signal generator 146 may provide the image sensor control signal ISCTL to the image sensor 120. The image sensor 120 positioned corresponding to the measuring area MA may be operated based on the image sensor control signal ISCTL provided from the control signal generator 146. The image sensor 120 may provide the measuring image data MIMG of the measuring area MA to the crop image data generator 144 of the image processor 140. The crop image data generator 144 may output the measuring image data MIMG to the analyzer 200 as the crop image data CIMG As described above, the imaging apparatus 100 in an exemplary embodiment may generate the crop image data CIMG by generating the reference image data RIMG of the reference area RA that includes the measuring area MA, detecting the measuring area MA based on the luminance of the reference image data RIMG and operating the image sensor 120 of the measuring area MA. Thus, an amount of data output from the imaging apparatus 100 and data processing time may be decreased.

FIG. 4 is a diagram illustrating for describing an operation of the imaging apparatus of FIG. 1.

Referring to FIG. 4, when the display panel displays a first test pattern 1ST TEST PATTERN, the image sensor may generate the reference image data that includes the measuring area in which the display panel is positioned. In an exemplary embodiment, the first test pattern 1ST TEST PATTERN may be a white color image to clarify the luminance difference between the measuring area and the peripheral area of the measuring area, for example. The image processor may generate a first crop image data that includes the measuring image data of the measuring area by analyzing the luminance of the reference image data. The image processor may provide the first crop image to the analyzer. The analyzer may display a first crop image corresponding to the first crop image data and detect defects of the display panel that displays the first crop image. Further, the image processor may generate the image sensor control signal that operates the image sensor corresponding to the measuring area.

When the display panel displays a second test pattern 2ND TEST PATTERN, the image sensor may generate the measuring image data of the measuring area based on the image sensor control signal. The image processor may provide the measuring image data to the analyzer as a second crop image data. The analyzer may display a second crop image corresponding to the second crop image data and detect the defect of the display panel that displays the second crop image.

When the display panel displays a third test pattern 3RD TEST PATTERN, the image sensor may generate the measuring image data of the measuring area based on the image sensor control signal. The image processor may provide the measuring image data to the analyzer as a third crop image data. The analyzer may display a third crop image corresponding to the third crop image data and detect defects of the display panel that displays the third crop image.

When the display panel displays a fourth test pattern 4TH TEST PATTERN, the image sensor may generate the measuring image data of the measuring area based on the image sensor control signal. The image processor may provide the measuring image data to the analyzer as a fourth crop image data. The analyzer may display a fourth crop image corresponding to the fourth crop image data and detect defects of the display panel that displays the fourth crop image.

In an exemplary embodiment, the first test pattern 1ST TEST PATTERN may be a white color image, the second test pattern 2ND TEST PATTERN may be a red color image, the third test pattern 3RD TEST PATTERN may be a green color image, and the fourth test pattern 4TH TEST PATTERN may be a blue color image, for example. However, the invention is not limited thereto, and in another exemplary embodiment, the first to fourth test patterns may be other colors. In an exemplary embodiment, the first test pattern 1ST TEST PATTERN, the second test pattern 2ND TEST PATTERN, the third test pattern 3RD TEST PATTERN, and the fourth test pattern 4TH TEST PATTERN may be an image that includes a stripe or a lattice. However, the invention is not limited thereto, and in another exemplary embodiment, the first to fourth test patterns may include other shapes.

As described above, the imaging apparatus in an exemplary embodiment may generate the crop image data by generating the reference image data in a first driving, detecting the measuring area based on the luminance of the reference image data, and operating the image sensor of the measuring area. Thus, the amount of the data output from the imaging apparatus and the data processing time may be decreased.

Figure 5:
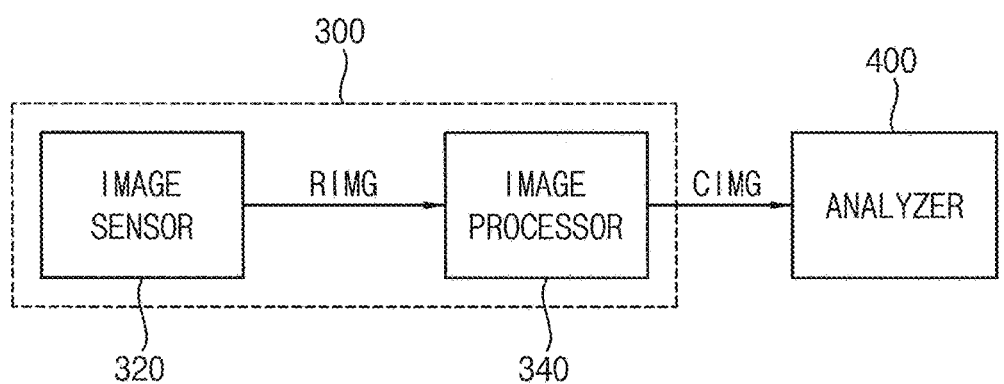
FIG. 5 is a block diagram illustrating an exemplary embodiment of an imaging apparatus.
Figure 6:
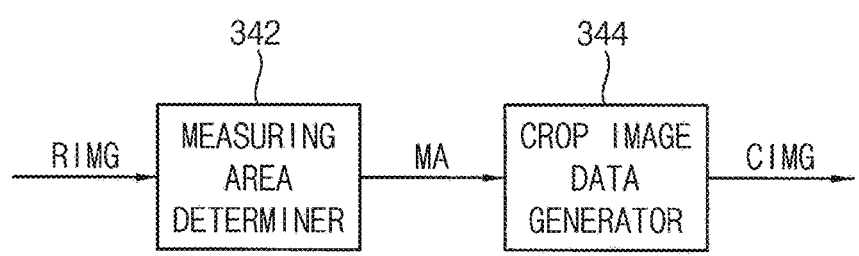
FIG. 6 is a block diagram illustrating an image process included in the imaging apparatus of FIG. 5.

FIG. 5 is a block diagram illustrating an exemplary embodiment of an imaging apparatus. FIG. 6 is a block diagram illustrating an image process included in the imaging apparatus of FIG. 5.

Referring to FIG. 5, an imaging apparatus 300 in an exemplary embodiment may include an image sensor 320 and an image processor 340. The imaging apparatus 300 of FIG. 5 may be coupled to an analyzer 400.

The image sensor 320 may generate a reference image data RIMG of a reference area RA (refer to FIG. 2) that includes a measuring area MA in which a display panel is positioned. The image sensor 320 may convert a light signal that includes image information of the reference area RA to an electric signal. In some exemplary embodiments, the image sensor 320 may be a CCD image sensor. In other exemplary embodiments, the image sensor 320 may be a CMOS image sensor. The image sensor 320 may generate the reference image data RIMG of the reference area RA.

The image processor 340 may determine the measuring area MA by analyzing luminance of the reference image data RIMG and generate a crop image data CIMG that includes the measuring image data of the measuring area MA.

Referring to FIG. 6, the image processor 340 may include a measuring area determiner 342 and a crop image data generator 344.

The measuring area determiner 342 may receive the reference image data RIMG from the image sensor 320. The measuring area determiner 342 may detect the measuring area MA by analyzing the luminance of the reference image data RIMG When the display panel is positioned in the measuring area MA and the display panel displays a test pattern, a luminance difference between an area in which the display panel is not positioned and the measuring area MA in which the display panel is positioned may be occurred. In an exemplary embodiment, when the display panel displays the test pattern that is white color, the area in which the display panel is not positioned may represent a black color and the measuring area MA in which the display panel is positioned may represent the white color, for example. The measuring area determiner 342 may detect the measuring area MA using the luminance of the reference image data RIMG The crop image data generator 344 may generate the crop image data CIMG that includes the measuring area data of the reference image data RIMG That is, the crop image data generator 344 may crop the image data of a peripheral area that surrounds the measuring area MA while remaining an image data corresponding to the measuring area MA of the reference image data RIMG The crop image data generator 344 may output the crop image data CIMG to the analyzer 400.

The analyzer 400 may display a crop image corresponding to the crop image data CIMG provided from the image processor 340 on the display panel and detect defects by analyzing the crop image.

As described above, the imaging apparatus 300 in an exemplary embodiment may generate the reference image data RIMG of the reference area RA that includes the measuring area MA, detect the measuring area MA based on the luminance of the reference image data RIMG, and generate the crop image data CIMG that represents the measuring image data of the measuring area MA by cropping the reference image data RIMG Thus, an amount of data output from the imaging apparatus 300 and data processing time may be decreased.

Figure 7:
FIG. 7 is a diagram illustrating for describing an operation of the imaging apparatus of FIG. 5.
Figure 7:
Figure 7:
Figure 7:
Figure 7:
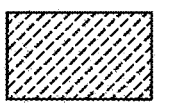
Figure 7:
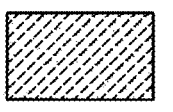
Figure 7:
Figure 7:
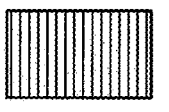
Figure 7:
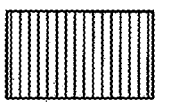
Figure 7:
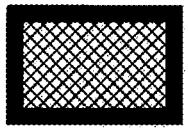
Figure 7:
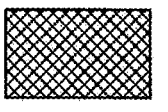
Figure 7:
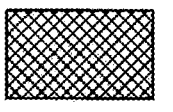

FIG. 7 is a diagram illustrating for describing an operation of the imaging apparatus of FIG. 5.

Referring to FIG. 7, when the display panel displays a first test pattern 1ST TEST PATTERN, the image sensor may generate the reference image data that includes the measuring area in which the display panel is positioned. The image processor may generate a first crop image data that includes the measuring image data of the measuring area by analyzing the luminance of the reference image data. The image processor may provide the first crop image to the analyzer. The analyzer may display a first crop image corresponding to the first crop image data on the display panel and detect defects of the display panel that displays the first crop image.

When the display panel displays a second test pattern 2ND TEST PATTERN, the image sensor may generate the reference image data that includes the measuring area in which the display panel is positioned. The image processor may generate a second crop image data that includes the measuring image data of the measuring area by analyzing the luminance of the reference image data. The image processor may provide the second crop image to the analyzer. The analyzer may display a second image corresponding to the second crop image data on the display panel and detect the defect of the display panel that displays the second crop image.

When the display panel displays a third test pattern 3RD TEST PATTERN, the image sensor may generate the reference image data that includes the measuring area in which the display panel is positioned. The image processor may generate a third crop image data that includes the measuring image data of the measuring area by analyzing the luminance of the reference image data. The image processor may provide the third crop image data to the analyzer. The analyzer may display a third crop image corresponding to the third crop image data on the display panel and detect the defect of the display panel that displays the third crop image.

When the display panel displays a fourth test pattern 4TH TEST PATTERN, the image sensor may generate the reference image data that includes the measuring area in which the display panel is positioned. The image processor may generate a fourth crop image data that includes the measuring image data of the measuring area by analyzing the luminance of the reference image data. The image processor may provide the fourth crop image data to the analyzer. The analyzer may display a fourth crop image corresponding to the fourth crop image data on the display panel and detect the defect of the display panel that displays the fourth crop image.

In an exemplary embodiment, the first test pattern 1ST TEST PATTERN may be a white color image, the second test pattern 2ND TEST PATTERN may be a red color image, the third test pattern 3RD TEST PATTERN may be a green color image, and the fourth test pattern 4TH TEST PATTERN may be a blue color image, for example. However, the invention is not limited thereto, and in another exemplary embodiment, the first to fourth test patterns may be other colors. In an exemplary embodiment, the first test pattern 1ST TEST PATTERN, the second test pattern 2ND TEST PATTERN, the third test pattern 3RD TEST PATTERN, and the fourth test pattern 4TH TEST PATTERN may be an image that includes a stripe or a lattice. However, the invention is not limited thereto, and in another exemplary embodiment, the first to fourth test patterns may include other shapes.

As described above, the imaging apparatus in an exemplary embodiment may generate the reference image data, detect the measuring area based on the luminance of the reference image data, and generate the crop image data that represents the measuring image data of the measuring area by cropping the reference image data. Thus, the amount of the data output from the imaging apparatus and the data processing time may be decreased.

Figure 8:
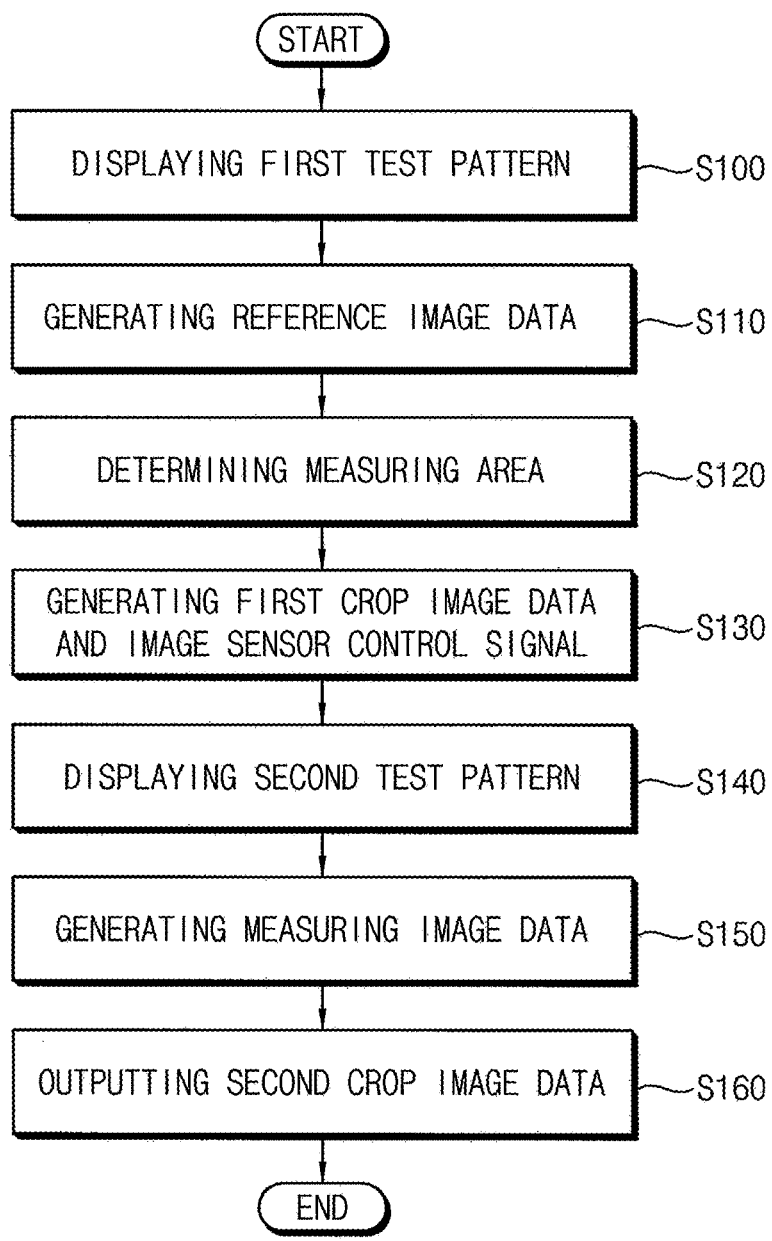
FIG. 8 is a flow chart illustrating an exemplary embodiment of a driving method of an imaging apparatus.

FIG. 8 is a flow chart illustrating an exemplary embodiment of a driving method of an imaging apparatus.

Referring to FIG. 8, a driving method of an imaging apparatus in an exemplary embodiment may include an operation of displaying a first test pattern S100, generating a reference image data S110, an operation of determining a measuring area S120, an operation of generating a first crop image data and an image sensor control signal S130, an operation of displaying a second test pattern S140, an operation of generating a measuring image data S150, and an operation of outputting a second crop image data S160.

The driving method of the imaging apparatus may display the first test pattern on a display panel S100. The display panel may be positioned in the measuring area of a reference area captured by an image sensor. The display panel may display the first test pattern. In an exemplary embodiment, the first test pattern may be a white color image, for example.

The driving method of the imaging apparatus may generate the reference image data of the reference area RA (refer to FIG. 2) that includes the measuring area in which the display panel is positioned using the image sensor S110. The image sensor may convert a light signal that includes image information of the reference area to an electric signal. In an exemplary embodiment, the image sensor may be a CCD image sensor or a CMOS image sensor, for example. The image sensor may generate the reference image data of the reference area.

The driving method of the imaging apparatus may determine the measuring area by analyzing the reference image data S120. The driving method of the imaging apparatus may receive the reference image data from the image sensor. The driving method of the imaging apparatus may determine the measuring area by analyzing luminance of the reference image data. In an exemplary embodiment, the driving method of the imaging apparatus may determine the measuring area based on a luminance difference between the measuring area in which the display panel displays the first test pattern and a peripheral area that surrounds the measuring area, for example.

The driving method of the imaging apparatus may generate the image sensor control signal and the first crop image data that includes the measuring image data of the measuring area based on the reference image data and the measuring area S130. The driving method of the imaging apparatus may generate the first crop image data by cropping the image data of the peripheral area that surrounds the measuring area while remaining the image data corresponding to the measuring area of the reference image data. The driving method of the imaging apparatus may output the first crop image data to the analyzer. The driving method of the imaging apparatus may display a first crop image corresponding to the first crop image data on the display panel and detect defects of the display panel. Further, the driving method of the imaging apparatus may generate the image sensor control signal that operates the image sensor corresponding to the measuring area.

The driving method of the imaging apparatus may display the second test pattern on the display panel S140. In an exemplary embodiment, the second test pattern may be a red color image, a green color image, a blue color image, an image including a stripe or a lattice, for example.

The driving method of the imaging apparatus may generate the measuring image data of the measuring area using the image sensor corresponding to the measuring area S150. The image sensor at the position corresponding to the measuring area may be operated based on the image sensor control signal. That is, the driving method of the imaging apparatus may generate the measuring image data in which the image data of the peripheral area that surrounds the measuring area is cropped using the image sensor at the position corresponding to the measuring area.

The driving method of the imaging apparatus may output the measuring image data provided from the image sensor as the second crop image data S160. The driving method of the imaging apparatus may output the second crop image data to the analyzer. The driving method of the imaging apparatus may display a second crop image corresponding to the second crop image data on the display panel and detect defects of the display panel.

As described above, the driving method of the imaging apparatus may generate the reference image data of the display panel that displays the first test pattern, determine the measuring area based on the reference image data, and generate the first crop image data that represents the measuring image data of the measuring area based on the reference image data and the measuring area. Further, the driving method of the imaging apparatus may display the second test pattern in the display panel, operate the image sensor corresponding to the measuring area, and output the measuring image data of the measuring area as the second crop image data. Thus, the driving method of the imaging apparatus may decrease the amount of the data output from the imaging apparatus and the data processing time.

Figure 9:
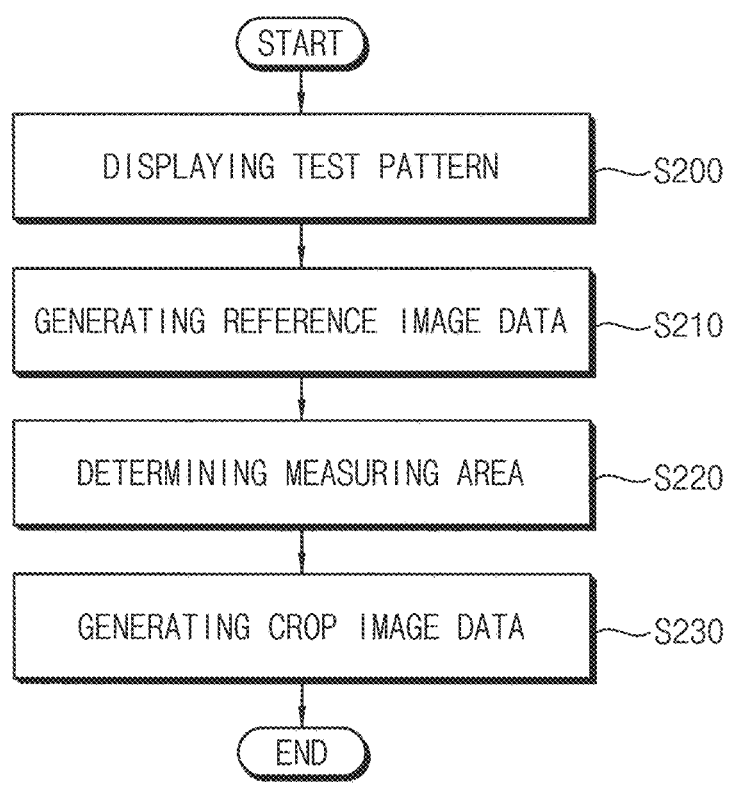
FIG. 9 is a flow chart illustrating an exemplary embodiment of a driving method of an imaging apparatus.

FIG. 9 is a flow chart illustrating another exemplary embodiment of a driving method of an imaging apparatus.

Referring to FIG. 9, a driving method of the imaging apparatus may include an operation of displaying a test pattern on a display panel S200, an operation of generating a reference image data S210, an operation of determining a measuring area S220, and an operation of generating a crop image data S230.

The driving method of the imaging apparatus may display the test pattern on the display panel. The display panel may be positioned in the measuring area of the reference area captured by an image sensor. The image sensor may convert a light signal that includes image information of the reference area to an electric signal. In an exemplary embodiment, the image sensor may be a CCD image sensor or a CMOS image sensor, for example. The image sensor may generate the reference image data of the reference area.

The driving method of the imaging apparatus may determine the measuring area by analyzing the reference image data S220. The driving method of the imaging apparatus may receive the reference image data from the image sensor. The driving method of the imaging apparatus may determine the measuring area by analyzing luminance of the reference image data. In an exemplary embodiment, the driving method of the imaging apparatus may determine the measuring area based on a luminance difference between the measuring area in which the display panel displays the test pattern and a peripheral area that surrounds the measuring area, for example The driving method of the imaging apparatus may generate the crop image data that includes the measuring image data of the measuring area based on the reference image data and the measuring area S230. The driving method of the imaging apparatus may generate the crop image data by cropping the image of the peripheral area that surrounds the measuring area while remaining the image data corresponding to the measuring area of the reference image data. The driving method of the imaging apparatus may output the crop image data to the analyzer. The driving method of the imaging apparatus may display a crop image corresponding to the crop image data and detect defects of the display panel.

As described above, the driving method of the imaging apparatus may generate the reference image data of the display panel that displays the test pattern, determine the measuring area based on the reference image data, and generate the crop image data that represents the measuring image data of the measuring area based on the reference image data and the measuring area. Thus, the driving method of the imaging apparatus may decrease the amount of the data output from the imaging apparatus and the data processing time.

The invention may be applied to an apparatus that captures the display panel. In an exemplary embodiment, the invention may be applied to an inspection apparatus of the LCD panel, the FED panel, the PDP, the OLED panel, etc., for example.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An imaging apparatus comprising:
   an image sensor which generates a reference image data of a reference area which includes a measuring area in which a display panel is positioned; and
   an image processor which determines the measuring area by analyzing luminance of the reference image data and generates a crop image data,
   wherein
   the crop image data includes a measuring image data of the measuring area provided from the image sensor, and
   the measuring image data is generated by the image sensor based on an image sensor control signal received from the image processor.

2. The imaging apparatus of claim 1, wherein the image sensor control signal which operates the image sensor corresponding to the measuring area.

3. The imaging apparatus of claim 2, wherein when the display panel displays a first test pattern, the image sensor generates the reference image data which includes the measuring area, and the image processor generates a first crop image data which includes a first measuring image data based on the reference image data.

4. The imaging apparatus of claim 3, wherein when the display panel displays a second test pattern after displaying the first test pattern, the image sensor generates a second measuring image data of the measuring area based on the image sensor control signal, and the image processor outputs the second measuring image data provided from the image sensor as a second crop image data.

5. The imaging apparatus of claim 2, wherein the image processor includes:
   a measuring area determiner which determines the measuring area based on the reference image data;
   a crop image data generator which generates the crop image data; and
   a control signal generator which generates the image sensor control signal based on the measuring area.

6. The imaging apparatus of claim 1, wherein when the display panel displays a first test pattern, the image processor generates a first crop image data which includes a first measuring image data based on the reference image data, and
   wherein when the display panel displays a second test pattern after displaying the first test pattern, the image processor generates a second crop image data which includes a second measuring image data based on the reference image data.

7. The imaging apparatus of claim 6, wherein the image processor includes:
   a measuring area determiner which determines the measuring area based on the reference image data; and
   a crop image data generator which generates each of the first crop image data and the second crop image data.

8. The imaging apparatus of claim 1, wherein the image sensor is a complementary metal oxide semiconductor image sensor.

9. The imaging apparatus of claim 1, wherein the image sensor is a charge coupled device image sensor.

10. The imaging apparatus of claim 1,
    wherein the image processor is coupled to an analyzer, and
    wherein the analyzer displays a crop image corresponding to the crop image data.

11. A driving method of an imaging apparatus, the method comprising:
    displaying a first test pattern on a display panel;
    generating a reference image data of a reference area which includes a measuring area in which the display panel is positioned using an image sensor;
    determining a measuring area by analyzing the reference image data;
    generating an image sensor control signal and a first crop image data which includes a first measuring image data of the measuring area based on the reference image data and the measuring area;
    displaying a second test pattern on the display panel;
    generating a second measuring image data of the measuring area using the image sensor corresponding to the measuring area; and
    outputting the measuring image data provided from the image sensor as a second crop image data,
    wherein
    the first and second measuring image data are generated by the image sensor based on the image sensor control signal received from the image processor.

12. The driving method of claim 11, wherein generating the measuring image data includes operating the image sensor corresponding to the measuring image.

13. The driving method of claim 11, wherein the determining the measuring area includes analyzing luminance of the reference image data.

14. The driving method of claim 11, wherein the image sensor is a complementary metal oxide semiconductor image sensor.

15. The driving method of claim 11, wherein the image sensor is a charge coupled device image sensor.

16. A driving method of an imaging apparatus, the method comprising:
    displaying a test pattern on a display panel;
    generating a reference image data of a reference area which includes a measuring area in which the display panel is positioned using an image sensor;
    determining the measuring area by analyzing the reference image data; and
    generating a crop image data which includes a measuring image data of the measuring area based on the reference image data and the measuring area,
    wherein
    the measuring image data is generated by the image sensor based on an image sensor control signal received from the image processor.

17. The driving method of claim 16, wherein the determining the measuring area includes analyzing luminance of the reference image data.

18. The driving method of claim 16, wherein the image sensor is a complementary metal oxide semiconductor image sensor.

19. The driving method of claim 16, wherein the image sensor is a charge coupled device image sensor.

* * * * *